(12) United States Patent
Boss et al.

(10) Patent No.: US 10,904,338 B2
(45) Date of Patent: Jan. 26, 2021

(54) IDENTIFYING DATA FOR DEDUPLICATION IN A NETWORK STORAGE ENVIRONMENT

(71) Applicant: International Business Machines Corporation, Armonk, NY (US)

(72) Inventors: Gregory J. Boss, Saginaw, MI (US); Itzhack Goldberg, Hadera (IL); Jonathan D. Herd, Beaconsfield (GB); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/574,463

(22) Filed: Sep. 18, 2019

(65) Prior Publication Data

US 2020/0014756 A1 Jan. 9, 2020

Related U.S. Application Data

(63) Continuation of application No. 15/077,285, filed on Mar. 22, 2016, now Pat. No. 10,574,751.

(51) Int. Cl.
*G06F 15/173* (2006.01)
*H04L 29/08* (2006.01)
*G06F 3/06* (2006.01)
*H04L 12/26* (2006.01)
*H04L 29/06* (2006.01)

(52) U.S. Cl.
CPC .......... *H04L 67/1097* (2013.01); *G06F 3/067* (2013.01); *G06F 3/0613* (2013.01); *G06F 3/0641* (2013.01); *H04L 43/0858* (2013.01); *H04L 43/0882* (2013.01); *H04L 67/06* (2013.01); *H04L 67/1095* (2013.01); *H04L 67/42* (2013.01)

(58) Field of Classification Search
CPC ............. H04L 67/1097; H04L 43/0858; H04L 43/0882; H04L 67/06; H04L 67/1095; H04L 67/43; G06F 3/0613; G06F 3/0641; G06F 3/067
See application file for complete search history.

(56) References Cited

U.S. PATENT DOCUMENTS

| 5,805,536 | A | 9/1998 | Gage |
| 6,567,914 | B1 | 5/2003 | Just |
| 7,343,152 | B1 | 3/2008 | Khorram |
| 7,555,531 | B2 | 6/2009 | Teodosiu |

(Continued)

OTHER PUBLICATIONS

"Client-side data deduplicalion", IBM Tivoli Storage Manager, Version 6.4, 4 pages, printed on Jan. 18, 2016, <https://www-01.ibm.com/support/knowledgecenter/SSTFZR_6.4.0/com.ibm.itsm.client.doc/c_dedup.html>.

(Continued)

*Primary Examiner* — Thanh T Nguyen
(74) *Attorney, Agent, or Firm* — Alexander G. Jochym

(57) ABSTRACT

A computer controls deduplication of data. The computer generates a hash of a remote data and a hash of a local data. The computer generates a set of unmatched hash data based on a comparison of the hash of the remote data against the hash of the local data. The computer generates a splitting cost that is associated with splitting the set of unmatched hash data. The computer sends a request to a server based on a comparison of the splitting cost to a threshold. The request dictates sending of the remote data to a storage controller.

20 Claims, 5 Drawing Sheets

(56) References Cited

U.S. PATENT DOCUMENTS

| | | | | |
|---|---|---|---|---|
| 8,565,310 | B2 | 10/2013 | Pearlstein | |
| 8,712,978 | B1* | 4/2014 | Shilane | G06F 16/1744 707/693 |
| 8,854,972 | B1 | 10/2014 | Li | |
| 9,141,301 | B1* | 9/2015 | Wallace | G06F 3/0683 |
| 9,235,590 | B1 | 1/2016 | Wang | |
| 9,256,368 | B2 | 2/2016 | Welnicki | |
| 9,400,610 | B1* | 7/2016 | Wallace | G06F 3/0652 |
| 9,946,724 | B1 | 4/2018 | Ghosh | |
| 10,075,520 | B2* | 9/2018 | Lau | H04L 67/125 |
| 10,135,462 | B1* | 11/2018 | Wallace | G06F 11/1453 |
| 2008/0034268 | A1 | 2/2008 | Dodd | |
| 2008/0243957 | A1 | 10/2008 | Prahlad | |
| 2010/0031000 | A1 | 2/2010 | Flynn | |
| 2010/0094817 | A1 | 4/2010 | Ben-Shaul | |
| 2010/0280711 | A1 | 11/2010 | Chen | |
| 2011/0271010 | A1 | 11/2011 | Kenchammana | |
| 2012/0310890 | A1 | 12/2012 | Dodd | |
| 2013/0103951 | A1* | 4/2013 | Klevan | G07C 9/257 713/186 |
| 2013/0204455 | A1 | 8/2013 | Chia | |
| 2013/0262396 | A1* | 10/2013 | Kripalani | G06F 11/1469 707/674 |
| 2013/0297867 | A1* | 11/2013 | Wright | G06F 16/182 711/112 |
| 2014/0095213 | A1 | 4/2014 | Gwilliam | |
| 2014/0095439 | A1 | 4/2014 | Ram | |
| 2014/0136789 | A1 | 5/2014 | Madan | |
| 2015/0213047 | A1 | 7/2015 | Madan | |
| 2015/0235032 | A1 | 8/2015 | Grube | |
| 2015/0261445 | A1 | 9/2015 | Chatterjee | |
| 2016/0007924 | A1 | 1/2016 | Eigler et al. | |
| 2016/0085751 | A1 | 3/2016 | Camble | |
| 2016/0098469 | A1* | 4/2016 | Allinson | G06F 16/178 707/610 |
| 2016/0110260 | A1 | 4/2016 | Chandrasekharan | |
| 2016/0162507 | A1 | 6/2016 | Gupta | |
| 2016/0170657 | A1 | 6/2016 | Suehr | |
| 2017/0090786 | A1 | 3/2017 | Parab | |
| 2017/0279889 | A1 | 9/2017 | Boss | |
| 2018/0268019 | A1* | 9/2018 | Rostagni | G06F 16/2365 |
| 2019/0155801 | A1* | 5/2019 | Karunanithi | G06F 16/2365 |

OTHER PUBLICATIONS

"De-Duplication And Your Backup", Code 42, Support, CrashPlan, Version 4, Last updated Dec. 17, 2015, printed on Dec. 23, 2015, 1 page, <http://support.code42.com/CrashPlan/4/Backup/De-Duplication_And_Your_Backup>.

IBM Appendix P., "List of IBM Patents or Patent Applications to be Treated as Related", Dated Herewith, 2 pages.

* cited by examiner

IDENTIFYING DATA FOR DEDUPLICATION IN A NETWORK STORAGE ENVIRONMENT

BACKGROUND

The present invention relates generally to the field of data storage management and more particularly to identifying data for deduplication.

Data deduplication is a data compression technique for eliminating repeated copies of the same data. Data deduplication improves storage utilization and, when applied to network data transfers, reduces the volume of data transmitted. In data deduplication, unique files (or, more generally, byte patterns), are identified and stored for analysis. This analysis may include comparing other files to the unique files and eliminating redundant files. Current data deduplication methods face difficulty with identifying redundant data files and with the amount of memory required to identify data for deduplication.

SUMMARY

One aspect of the invention provides a computer implemented method. The method comprising: generating, by one or more processors, a hash of a remote data and a hash of a local data; generating, by one or more processors, a set of unmatched hash data based on a comparison of the hash of the remote data against the hash of the local data; estimating, by the one or more processors, a splitting cost that is associated with splitting the set of unmatched hash data; and sending, by the one or more processors, a request to a server based on a comparison of the splitting cost to a threshold, wherein the request dictates, in part, a sending of the remote data to a storage controller.

Another aspect of the invention provides a computer program product embodied as program instructions stored on a computer readable storage medium. The program instructions comprising instructions to cause a computing device to perform a method, the method comprising: generating, by one or more processors, a hash of a remote data and a hash of a local data; generating, by one or more processors, a set of unmatched hash data based on a comparison of the hash of the remote data against the hash of the local data; estimating, by the one or more processors, a splitting cost that is associated with splitting the set of unmatched hash data; and sending, by the one or more processors, a request to a server based on a comparison of the splitting cost to a threshold, wherein the request dictates, in part, a sending of the remote data to a storage controller.

Another aspect of the invention provides a computer system. The computer system including program instructions stored on a computer readable storage medium that, when executed by the computer system, causes the computer system to perform a method, the method comprising: generating, by one or more processors, a hash of a remote data and a hash of a local data; generating, by one or more processors, a set of unmatched hash data based on a comparison of the hash of the remote data against the hash of the local data; estimating, by the one or more processors, a splitting cost that is associated with splitting the set of unmatched hash data; and sending, by the one or more processors, a request to a server based on a comparison of the splitting cost to a threshold, wherein the request dictates, in part, a sending of the remote data to a storage controller.

Still yet, any of the components of the present invention could be deployed, managed, serviced, etc., by a service provider who offers to implement management of data deduplication in a computer system. Embodiments of the present invention also provide and encompass related systems, methods, and/or program products.

DETAILED DESCRIPTION

Figure 1:
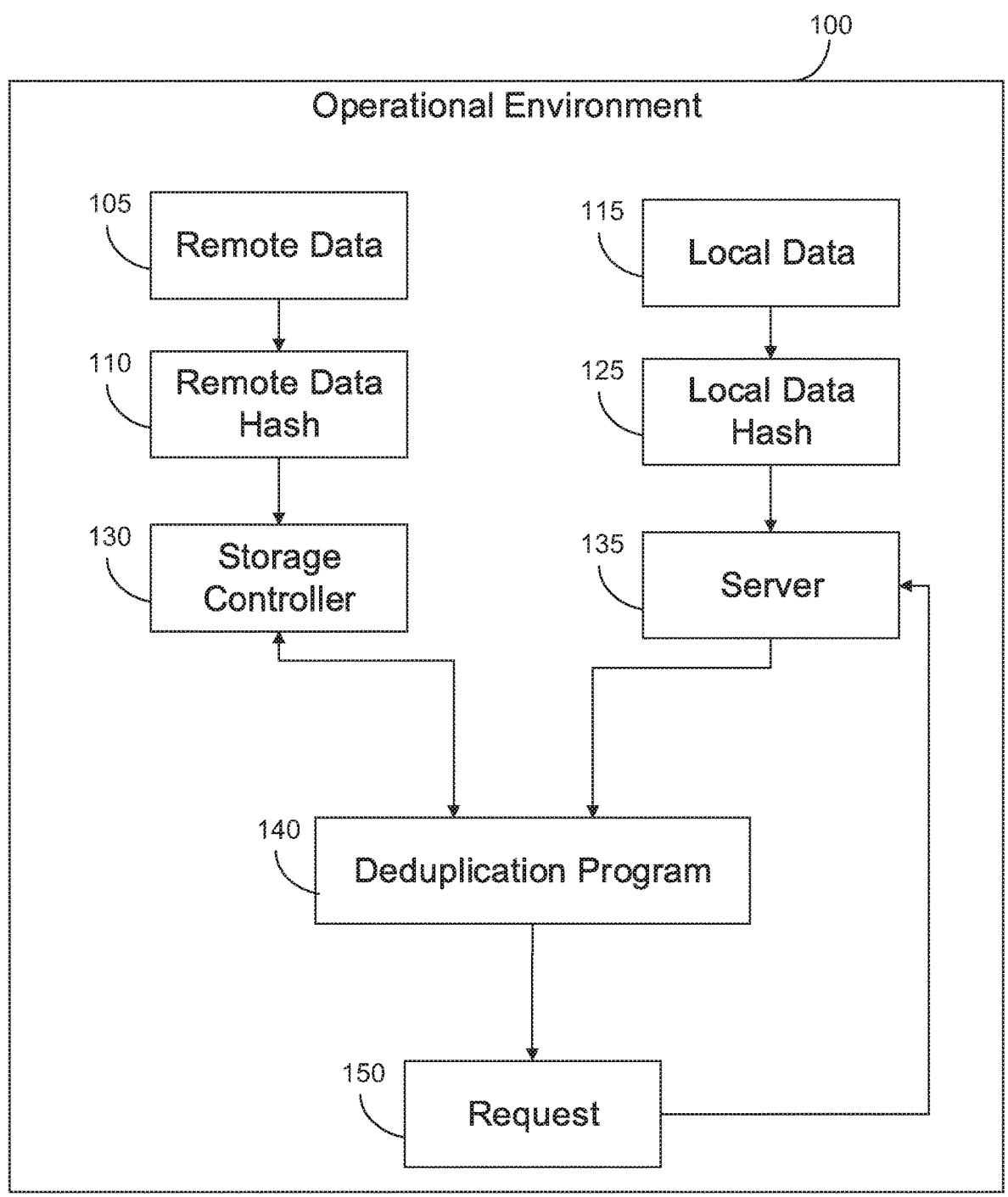
FIG. 1 is a block diagram of an operational environment suitable for operation of a deduplication program in accordance with at least one embodiment of the present invention.

Referring now to the invention in more detail, FIG. 1 is a block diagram displaying an exemplary operational environment suitable for operation of at least one embodiment of the invention. An operational environment 100 includes a remote data 105, a remote data hash 110 of the remote data 105, a storage controller 130, a local data 115, a local data hash 125 of the local data 115, a server 135, a deduplication program 140, and a request 160, all in mutual communication and interconnected via the operational environment 100. The operational environment may be a cloud-based, virtual, or distributed environment on defined server hardware, or, more generally, the operational environment 100 may be any type of environment suitable for access by the deduplication program 140.

The remote data 105 and the local data 115 may be data files, a collection of data files, an index of data files, a repository of data files, and/or a library of data files. The deduplication program 140 need not have direct access to the remote data 105. The remote data 105 is accessible to the deduplication program 140 via a network, such as the operational environment 100, or a network storage environment. The deduplication program 140 does have physical access to the local data 115.

The remote data hash 110 is a hash of the remote data 105. The local data hash 125 is a hash of the local data 115. The remote data hash 110 and the local data hash 125 are the result of a hash function being applied to the remote data 105 and the local data 115, respectively. A hash function is any function that can be used to map data of arbitrary size to data of fixed size. A hash function may utilize a hash table. In some embodiments, the server 135 hashes the local data 115 to yield the local data hash 125. In some embodiments, the deduplication program hashed the local data 115 to yield the local data hash 125.

In an embodiment, the storage controller 130 operates and manage a storage system. The storage system may include the remote data 105 and/or the remote data hash 110. The storage controller 130 may have processors embedded to perform functions related to data storage and storage management.

The server 135 is a computer program or a device that provides functionality for other programs, such as the deduplication program 140, or devices, such as the storage controller 130. The server 135 may be a database server, file server, web server, and/or application server.

The deduplication program 140 receives the remote data hash 110 via the storage controller 130, and the local data hash 125, via the server 135 as input and generates the request 160 as output. The request 160 may be a command, sequence of commands, and/or instructions capable of being understood by the storage controller 130 and the server 135. The request 160 may be sent to an index, repository, and/or library where the remote data 105 is stored.

Figure 2:
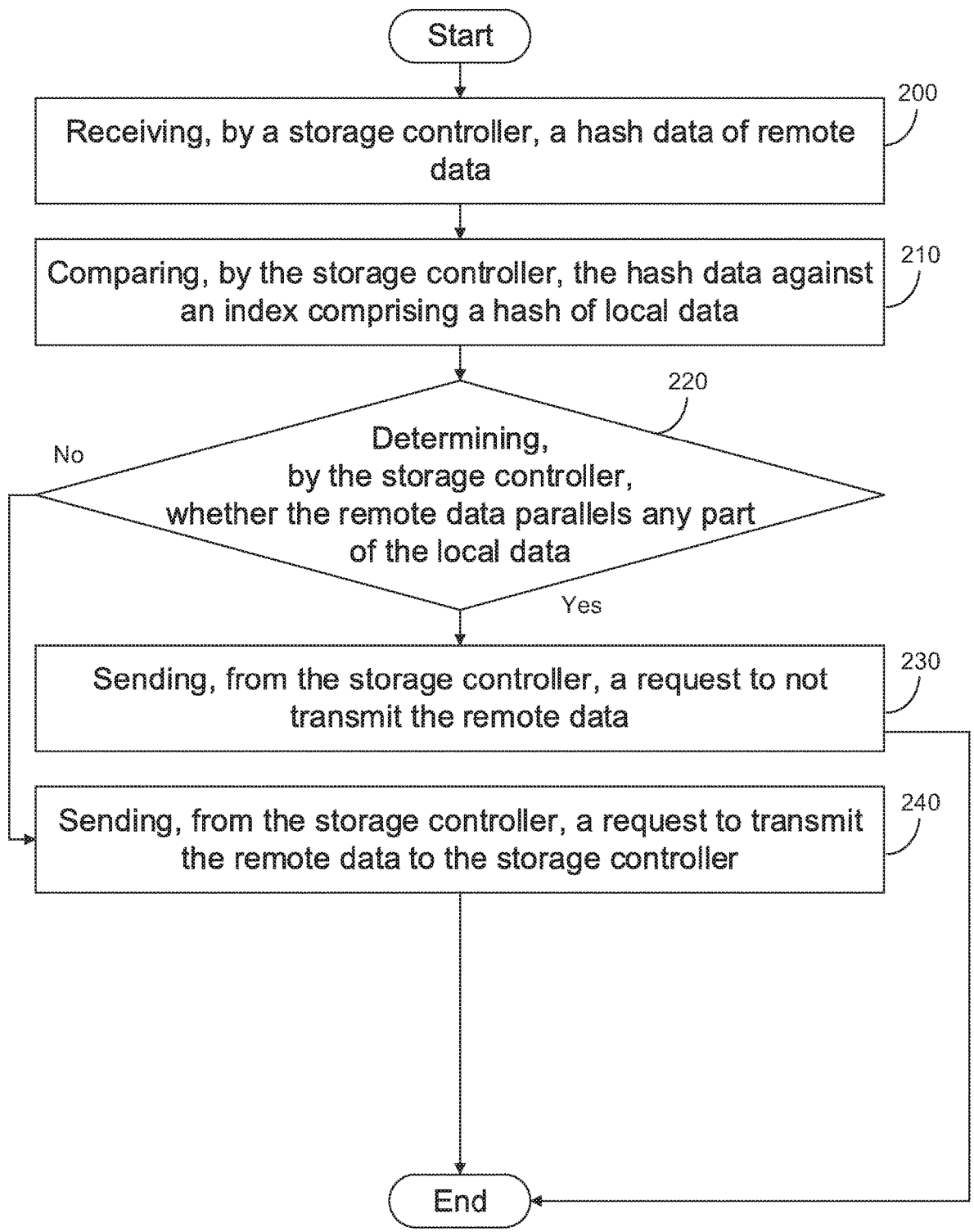
FIG. 2 is a flowchart depicting operational steps for a deduplication program, in accordance with at least one embodiment of the present invention.

FIG. 2 is a flowchart depicting the operational steps of the deduplication program 140, executing in the context of the operational environment 100 of FIG. 1, in accordance with an embodiment of the present invention.

At step 200, the deduplication program 140 receives, by the storage controller 130, the remote data hash 110. Receiving may include a user explicitly calling the deduplication program 140 from a command line interface using a reference to the remote data hash 110 as an argument. Alternatively, receiving may include automated calls to the deduplication program 140, for example, from an integrated development environment or as part of a deduplication program management system.

At step 210, the deduplication program 140 compares, by the storage controller 130, the remote data hash 110 against an index, such as the server 135. The index includes the local data hash 125. Comparing the remote data hash 110 against the index includes comparing the remote data hash 110 to the local data hash 125. Comparing may include a segment scan or an index scan.

Comparing may include the deduplication program 140 receiving a hash miss. The hash miss is an indication that the remote data hash 110, or a portion of the remote data hash 110 is unmatched when compared to the local data hash 125. In such an embodiment, the deduplication program 140 may split the unmatched hash data to yield split unmatched hash data. Splitting may include dividing the remote data hash 110 into smaller sections so the deduplication program 140 can compare the smaller sections against the local data hash 125. Splitting may be based on a predetermined size reduction, such as dividing the remote data hash 110 in half, in thirds, or in quarters. In such an embodiment, the deduplication program 140 may send the split unmatched hash data to the storage controller 130. In such an embodiment, the deduplication program 140 may estimate a splitting cost. The splitting cost may be how much memory, time, storage, and/or power is required to split the remote hash data 110 into smaller section. The splitting cost may also include how much memory, time, storage, and/or power is required to compare the split unmatched hash data to the local data hash 125. In such an embodiment, the deduplication program 140 may respond to a splitting cost threshold whereby if the estimated splitting cost is below the splitting cost threshold, the deduplication program 140 sends a request, such as the request 160. In such an embodiment the request may be to send the remote data 105 to the storage controller 130.

At step 220, the deduplication program 140 determines, by the storage controller 130 whether the remote data 105 parallels any part of the local data 115, by comparing the remote data hash 110 to the local data hash 125. The deduplication program 140 may determine that the remote data 105 parallels any part of the local data 115 by comparing strings of the remote data hash 110 to strings of the local data hash 125. The deduplication program 140 may determine that the remote data 105 parallels any part of the local data 115 if the remote data hash 110 is found included in the context of the local data hash 125.

If yes, the remote data 105 parallels any part of the local data, the deduplication program 140 proceeds to step 230. At step 230, the deduplication program 140 sends, from the storage controller 130, a request, such as the request 160, to not transmit the remote data 105. The request 160 may indicate to the storage controller 130 that the storage controller 130 should flag the remote data 105 as archived, move the remote data 105, or delete the remote data 105. The request 160 may be sent to an index, repository, and/or library where the remote data 105 is stored.

If no, the remote data 105 does not parallel any part of the local data 115, the deduplication program 140 proceeds to step 240. At step 240, the hash comparing program sends, from the storage controller 130, a request, such as the request 160, to transmit the remote data 105 to the storage controller 130. The request 160 may be sent to an index, repository, and/or library where the remote data 105 is stored.

Figure 3:
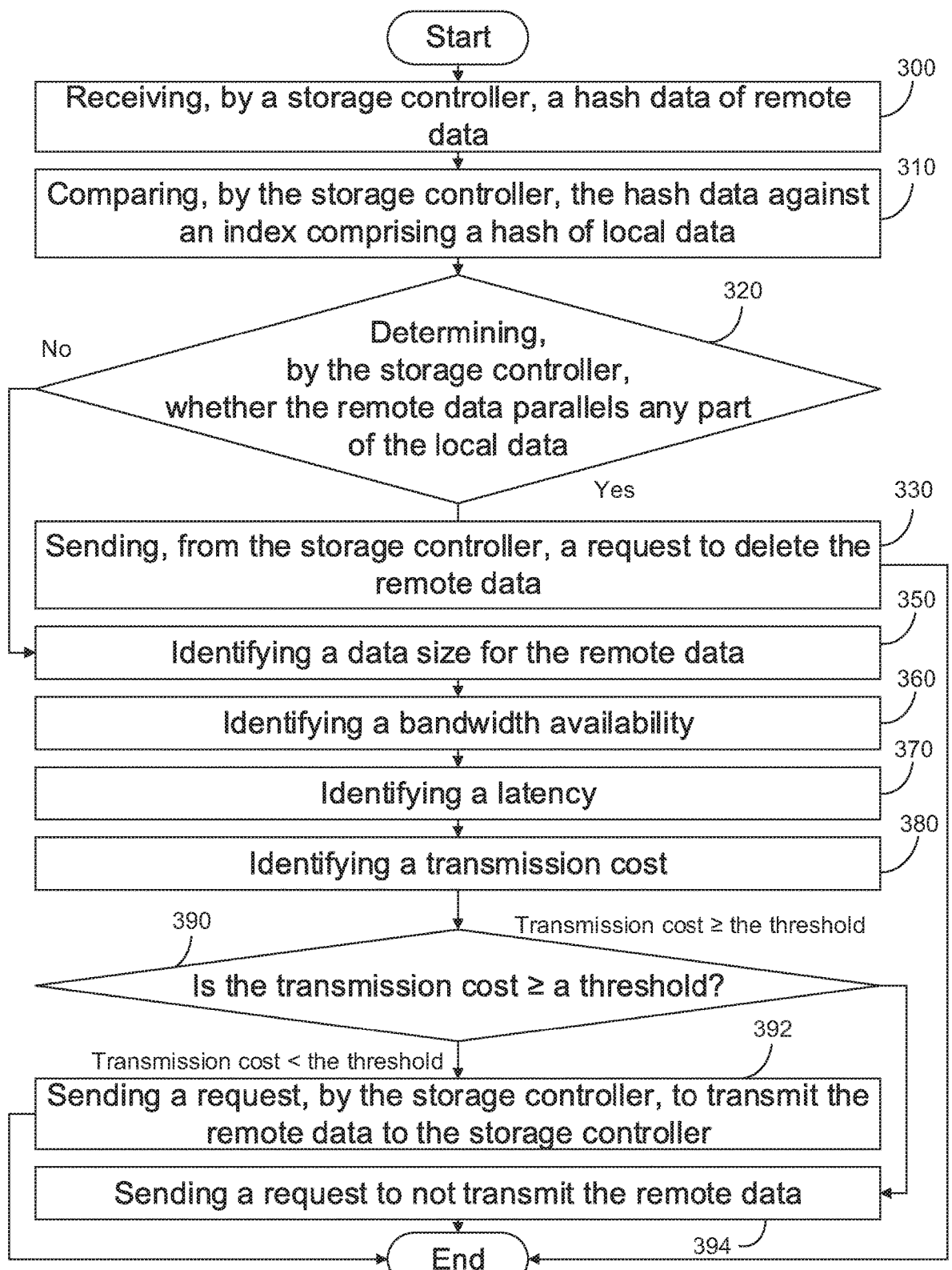
FIG. 3 is a flowchart depicting operational steps for a deduplication program with a transmission cost, in accordance with at least one embodiment of the present invention.

FIG. 3 is a flowchart depicting operational steps for a deduplication program 140 with a transmission cost, in accordance with at least one embodiment of the present invention.

The deduplication program 140 performs step 300, step 310, step 320, and step 330 in a manner similar to step 200, step 210, step 220, and step 230.

If at step 320, the deduplication program 140 determines no, the remote data 105 does not parallel any part of the local data 115, the deduplication program 140 proceeds to step 350.

At step 350, the deduplication program 140 identifies a data size for the remote data 105. Identifying may include a user explicitly calling the deduplication program 140 from a command line interface using a reference to the data size for the remote data 105 as an argument. Alternatively, receiving may include automated calls to the deduplication program 140, for example, from an integrated development environment or as part of a deduplication program management system. The data size of the remote data 105 may be a byte count for the remote data 105.

At step 360, the deduplication program 140 identifies a bandwidth availability. The bandwidth availability is between the server 135 and the storage controller 130. The bandwidth availability may be a bit-rate of available or consumed information capacity.

At step 370, the deduplication program 140 identifies a latency. The latency is between the server 135 and the storage controller 130. The latency is a time delay associated with the transmittal of data between the server 135 and the storage controller 130.

At step 380, the deduplication program 140 identifies a transmission cost. The transmission cost is based on the data size, bandwidth availability, and latency. The transmission cost may be based on a predetermined algorithm. The transmission cost may be determined dynamically via an analytics engine as each variable changes.

At step 390, the deduplication program 140 determines whether the transmission cost identified at step 380 is greater than or equal to a transmission cost threshold. The transmission cost threshold may be a predetermined threshold.

If the transmission cost is less than the threshold, the deduplication program 140 proceeds to step 392. At step 392 the deduplication program 140 sends a request, such as the request 160, by the storage controller 130, to send the remote data 105 to the storage controller 130.

If the transmission cost is greater than or equal to the threshold, the deduplication program 140 proceeds to step 394. At step 394 the deduplication program 140 sends a request, such as the request 160, by the storage controller 130, to not transmit the remote data 105.

Figure 4:
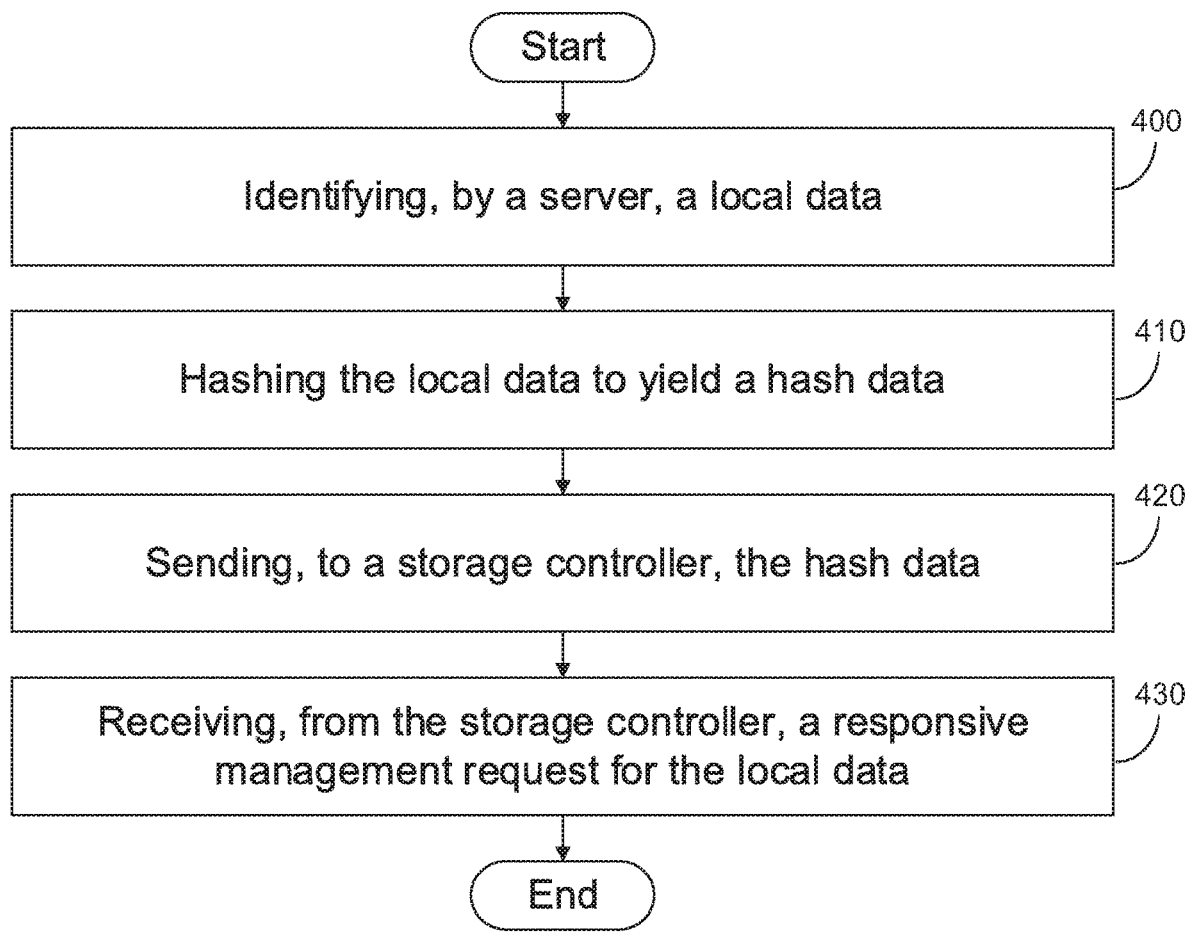
FIG. 4 is a flowchart depicting operational steps for a deduplication program, by a server, in accordance with at least one embodiment of the present invention.

FIG. 4 is a flowchart depicting operational steps for the deduplication program 140, by a server, in accordance with at least one embodiment of the present invention.

At step 400, the deduplication program 140 identifies, by a server, the local data 115. Identifying may include a user explicitly calling the deduplication program 140 from a command line interface using a reference to the local data 115 as an argument. Alternatively, receiving may include automated calls to the deduplication program 140, for example, from an integrated development environment or as part of a deduplication program management system.

At step 410, the deduplication program 140 hashes the local data 115 to yield the local data hash 125. In some embodiments the deduplication program 140 hashes the local data 115. In other embodiments, the deduplication program 140 hashes the local data 115 by the server 135.

At step 420, the deduplication program 140 sends the local data hash 125 to the storage controller 130. Sending may include transmitting, transferring, or otherwise forwarding the local data hash 125 to the storage controller 130.

At step 430, the deduplication program 140 receives, from the storage controller 130, a responsive management request, such as the request 160. The responsive management request may be a request to delete the local data 115. In such an embodiment, the deduplication program 140 may respond to the responsive management request by deleting the local data 115. The responsive management request may be a request to transmit the local data 115 to the storage controller 130. In such an embodiment, the deduplication program 140 may respond to the responsive management request by transmitting the local data 115 to the storage controller 130.

The responsive management request may be a request for the deduplication program 140 to identify a data size, a bandwidth availability between the server 135 and the storage controller 130, a latency between the server 135 and the storage controller 130. In such an embodiment, the deduplication program 140 may identify a transmission cost based on the data size, bandwidth availability, and latency. The deduplication program 140 may identify a transmission cost through a process similar to the steps of FIG. 3. The deduplication program 140 may compare the transmission cost to a threshold and respond to the transmission cost being less than the threshold by transmitting the local data 115 to the storage controller 130. The deduplication program 140 may respond to the transmission cost being greater than or equal to the threshold by deleting the local data 115.

Figure 5:
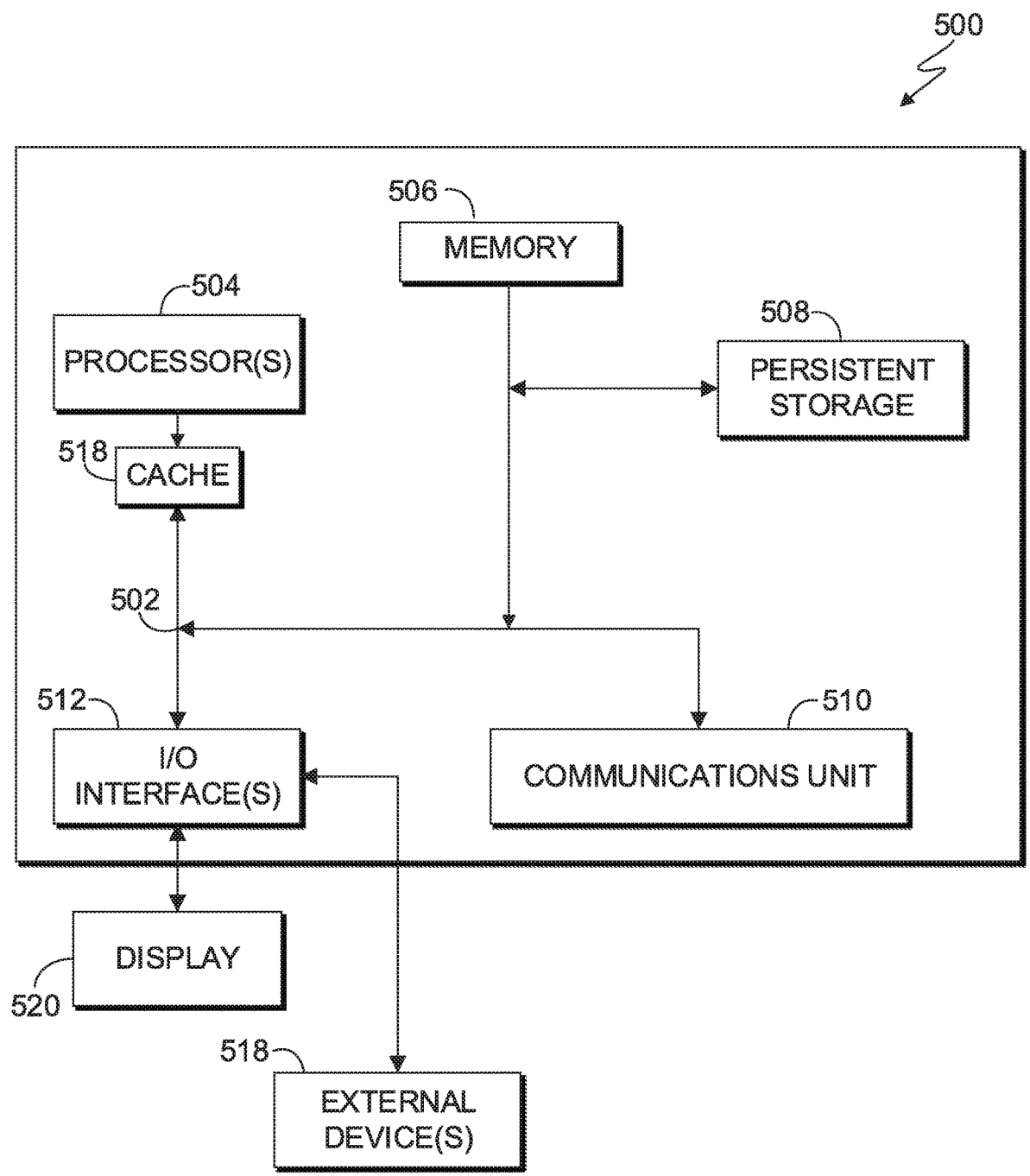
FIG. 5 is a block diagram of components of a computing apparatus suitable for executing a deduplication program, in accordance with at least one embodiment of the present invention.

FIG. 5 is a block diagram depicting components of a computer 500 suitable for executing the deduplication program 140. FIG. 5 displays the computer 500, the one or more processor(s) 504 (including one or more computer processors), the communications fabric 502, the memory 506, the RAM 516, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the deduplication program 140 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The deduplication program 140 may be downloaded to the persistent storage 508 through the communications unit 510. In the context of some embodiments of the present invention, the source of the various input data may be physically remote to the computer 500 such that the input data may be received, and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
generating, by one or more processors, a hash of a remote data and a hash of a local data;
generating, by one or more processors, a set of unmatched hash data based on a comparison of the hash of the remote data against the hash of the local data;
estimating, by the one or more processors, a splitting cost that is associated with splitting the set of unmatched hash data; and
sending, by the one or more processors, a request to a server based on a comparison of the splitting cost to a threshold, wherein the request dictates, in part, a sending of the remote data to a storage controller.

2. The method of claim 1, the method comprising:
sending, by the one or more processors, the hash of the remote data to the storage controller; and
comparing, by the one or more processors, the hash of the remote data against an index that includes one or more hashes of the local data.

3. The method of claim 1, the method comprising:
responsive to the splitting cost exceeding the threshold, configuring the request to include instructions that instruct the server to send the remote data to the storage controller.

4. The method of claim 2, the method comprising:
determining, by the one or more processors, whether the remote data parallels a part of the local data based on a comparison of the hash of the remote data with the index; and
responsive to a determination that the remote data parallels the part of the local data, configuring, by the one or more processors, the request to include instructions that instruct the server to refrain from sending the remote data to the storage controller.

5. The method of claim 2, the method comprising:
determining, by the one or more processors, whether the remote data parallels a part of the local data based on a comparison of the hash of the remote data with the index; and
responsive to a determination that the remote data does not parallel the part of the local data, configuring, by the one or more processors, the request to include instructions that instruct the server to send the remote data to the storage controller.

6. The method of claim 2, the method comprising:
determining, by the one or more processors, whether the remote data parallels a part of the local data based on a comparison of the hash of the remote data with the index; and
responsive to a determination that the remote data does not parallel the part of the local data determining a cost of transmitting the remote data based on at least one of: (a) a data size for the remote data, (b) a bandwidth availability between the server and the storage controller, or (c) a data transmission latency between the server and the storage controller.

7. The method of claim 6, the method comprising:
responsive to a determination that the cost of transmitting the remote data is less than a threshold, configuring, by the one or more processors, the request to include instructions that instruct the server to send the remote data to the storage controller.

8. The method of claim 6, the method comprising:
responsive to a determination that the cost of transmitting the remote data is equal to or greater than a threshold, configuring, by the one or more processors, the request to include instructions that instruct the server to refrain from sending the remote data to the storage controller.

9. The method of claim 2, the method comprising:
based on a result of a comparison of the hash of the remote data against the index, generating, by the one or more processors, an indication of a hash miss for an unmatched hash data included in the hash of the remote data;
generating, by the one or more processors, split unmatched hash data by splitting the unmatched hash data; and
configuring, by the one or more processors, the request to include instructions that instruct the server to send the split unmatched hash data to the storage controller.

10. A computer program product, the computer program product comprising a computer readable storage medium having program instructions embodied therewith, wherein the computer readable storage medium is not a transitory signal per se, the program instructions executable by a device to cause the device to perform a method comprising:
generating, by one or more processors, a hash of a remote data and a hash of a local data;
generating, by one or more processors, a set of unmatched hash data based on a comparison of the hash of the remote data against the hash of the local data;
estimating, by the one or more processors, a splitting cost that is associated with splitting the set of unmatched hash data; and
sending, by the one or more processors, a request to a server based on a comparison of the splitting cost to a threshold, wherein the request dictates, in part, a sending of the remote data to a storage controller.

11. The computer program product of claim 10, the method comprising:
sending, by the one or more processors, the hash of the remote data to the storage controller; and
comparing, by the one or more processors, the hash of the remote data against an index that includes one or more hashes of the local data.

12. The computer program product of claim 10, the method comprising:
responsive to the splitting cost exceeding the threshold, configuring the request to include instructions that instruct the server to send the remote data to the storage controller.

13. The computer program product of claim 11, the method comprising:
determining, by the one or more processors, whether the remote data parallels a part of the local data based on a comparison of the hash of the remote data with the index; and
responsive to a determination that the remote data parallels the part of the local data, configuring, by the one or more processors, the request to include instructions that instruct the server to refrain from sending the remote data to the storage controller.

14. The computer program product of claim 11, the method comprising:

determining, by the one or more processors, whether the remote data parallels a part of the local data based on a comparison of the hash of the remote data with the index; and responsive to a determination that the remote data does not parallel the part of the local data, configuring, by the one or more processors, the request to include instructions that instruct the server to send the remote data to the storage controller.

15. The computer program product of claim 11, the method comprising:

determining, by the one or more processors, whether the remote data parallels a part of the local data based on a comparison of the hash of the remote data with the index; and responsive to a determination that the remote data does not parallel the part of the local data determining a cost of transmitting the remote data based on at least one of: (a) a data size for the remote data, (b) a bandwidth availability between the server and the storage controller, or (c) a data transmission latency between the server and the storage controller.

16. The computer program product of claim 15, the method comprising:

responsive to a determination that the cost of transmitting the remote data is less than a threshold, configuring, by the one or more processors, the request to include instructions that instruct the server to send the remote data to the storage controller.

17. The computer program product of claim 15, the method comprising:

responsive to a determination that the cost of transmitting the remote data is equal to or greater than a threshold, configuring, by the one or more processors, the request to include instructions that instruct the server to refrain from sending the remote data to the storage controller.

18. The computer program product of claim 11, the method comprising:

based on a result of a comparison of the hash of the remote data against the index, generating, by the one or more processors, an indication of a hash miss for an unmatched hash data included in the hash of the remote data;

generating, by the one or more processors, split unmatched hash data by splitting the unmatched hash data; and configuring, by the one or more processors, the request to include instructions that instruct the server to send the split unmatched hash data to the storage controller.

19. A computer system, the computer system comprising:

one or more computer processors;

at least one computer readable storage medium that is not a transitory signal per se; and program instructions stored on the at least one computer readable storage medium, the program instructions being executable by at least one computer processor of the one or more computer processors to cause the at least one computer processor to perform a method comprising:

generating, by one or more processors, a hash of a remote data and a hash of a local data;

generating, by one or more processors, a set of unmatched hash data based on a comparison of the hash of the remote data against the hash of the local data;

estimating, by the one or more processors, a splitting cost that is associated with splitting the set of unmatched hash data; and sending, by the one or more processors, a request to a server based on a comparison of the splitting cost to a threshold, wherein the request dictates, in part, a sending of the remote data to a storage controller.

20. The computer system of claim 10, the method comprising:

sending, by the one or more processors, the hash of the remote data to the storage controller; and comparing, by the one or more processors, the hash of the remote data against an index that includes one or more hashes of the local data.

\* \* \* \* \*